United States Patent [19]

Gimbel

[11] Patent Number: 4,629,569
[45] Date of Patent: Dec. 16, 1986

[54] PROCESS AND DEVICE FOR THE SEPARATION OF IMPURITIES FROM LIQUIDS

[76] Inventor: Rolf D. Gimbel, Reuterstrasse 6, D-7505 Ettlingen, Fed. Rep. of Germany

[21] Appl. No.: 606,600

[22] Filed: May 3, 1984

[30] Foreign Application Priority Data

May 6, 1983 [DE] Fed. Rep. of Germany ....... 3316540

[51] Int. Cl.⁴ ............................................. B01D 13/00
[52] U.S. Cl. .................................... 210/636; 210/650; 210/488
[58] Field of Search ............... 210/489, 488, 650, 492, 210/651, 503, 504, 505, 636, 793

[56] References Cited

U.S. PATENT DOCUMENTS

| 3,158,532 | 11/1964 | Pall et al. | 210/505 |
| 3,238,056 | 3/1966 | Pall et al. | 210/505 X |
| 3,246,767 | 4/1966 | Pall et al. | 210/505 |
| 3,353,682 | 11/1967 | Pall et al. | 210/505 |

FOREIGN PATENT DOCUMENTS

| 1205492 | 11/1965 | Fed. Rep. of Germany | 210/356 X |
| 1226503 | 10/1966 | Fed. Rep. of Germany | 210/494 X |
| 3024108 | 4/1981 | Fed. Rep. of Germany | 210/440 X |
| 2224190 | 10/1974 | France | 210/521 X |
| 1543683 | 4/1979 | United Kingdom | 210/343 X |

OTHER PUBLICATIONS

Dorson, Jr. et al., Int. Pub. #WO82/03567, 10-1982.
Encyclopedia of Technical Chemistry, 4th Edition, vol. 2, Chapter on Filtration, pp. 154 to 198, 1972.

Primary Examiner—Frank Spear
Attorney, Agent, or Firm—Keil & Weinkauf

[57] ABSTRACT

Depth filter for the separation of turbidities from liquids with permeation layers (2), in which the filter bed consists of a plurality of thin permeable membrane layers (3) which are arranged one after the other and in mutually spaced relationship perpendicularly to the principal flow direction and in which the individual membrane layers (3) contain macroholes (4) through which flows the principal proportion of the liquid throughput passing through the filter. The process for the separation of turbidities from liquids in the use of such a device makes a simple regeneration for the filter possible wherein the filter is regenerated by means of a short time cross-wise flushing of the filter bed with a superimposed upward or downward flow. In addition in the flushing phase the liquid may be exposed to an ultrasound blast.

9 Claims, 6 Drawing Figures

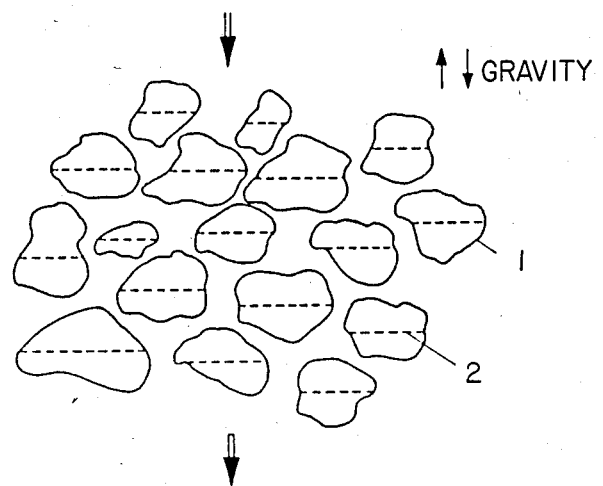
FIG. 1
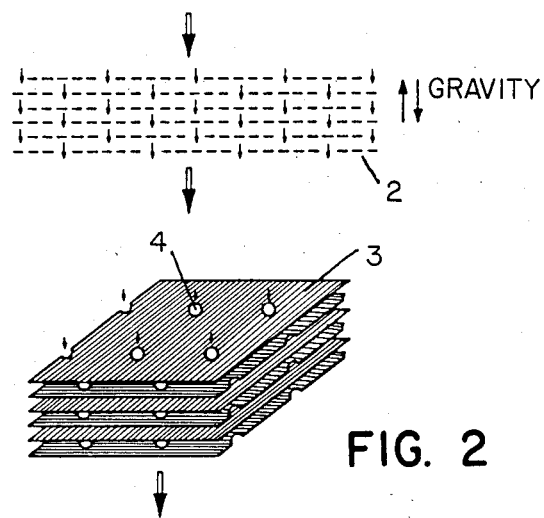
FIG. 2
FIG. 3
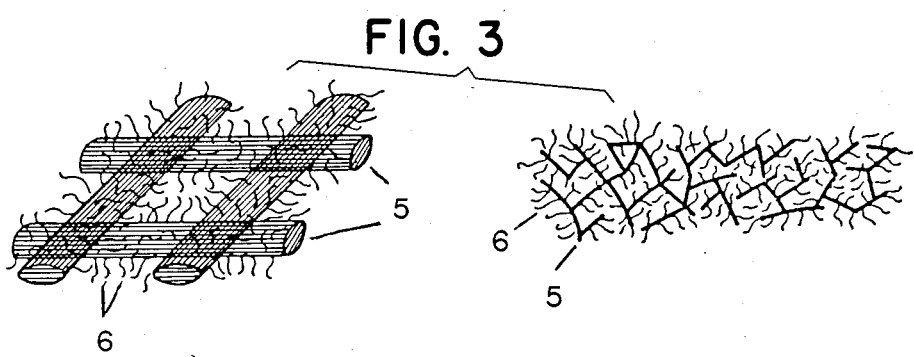

PROCESS AND DEVICE FOR THE SEPARATION OF IMPURITIES FROM LIQUIDS

BACKGROUND OF THE INVENTION AND PRIOR ART

The subject of the invention is a device for the separation of turbidities from liquids with permeation layers in the form of a depth filter having a specially designed filter bed, and a process for operating such a filter.

In the conventional mode of separating turbidities from liquids by means of depth filters as they are frequently used in the treatment of water, the filter bed generally consists of granular materials such as quartz, anthracite, pumice and the like. In this connection the following disadvantages are noted:

1. The predominant portion of the volume of the filter bed is taken up by the mass of the filter material which is inert with respect to the particle deposition process.
2. The degree of particle separation in an elementary filter layer of the height of the filter grain diameter, is generally very small (below 1–2%).
3. The conventional maximal turbidity deposit in the filter upon the attainment of which the depth filter needs to be regenerated either because of excessive increase in pressure drop or because of insufficient quality of the filtrate, is extremely small (in general notably smaller than 5% of the bed volume).
4. Depending on the size of the filter material and the properties of the turbidities a reversal to cake filtration may occur, and this gives rise to an extremely strong increase in pressure drop across the filter so that the filter must be regenerated already after a very short period of operation.

Especially the circumstances listed under 1 to 3 necessitate relatively large bed heights of depth filters, which in general lie between 1 and 3 m and require relatively low filtration velocities, that is approximately 5 m/h to 20 m/h.

OBJECT AND SUMMARY OF THE INVENTION

It is the object of the invention to provide a new filter device using the principle of a depth filter and a process for separating impurities from liquids, which avoids the disadvantages of the known depth filters.

This object is met, briefly, by a device in the form of a depth filter, for separating turbidities from liquids, wherein the filter bed comprises a plurality of thin permeable membrane layers which are serially arranged perpendicularly to the principal flow direction, and wherein the individual membrane layers contain macroholes through which flows the major portion of the liquid throughput passing through the filter bed.

The object is further met, in brief, by a process for separating turbidities from liquids which uses a depth filter with permeation layers, said process comprising providing a filter bed including a plurality of serially arranged permeable membrane layers with macroholes and carrying out the filter regeneration by short time cross-wise flushing of the filter bed with a superimposed upward or downward flow through the filter.

As will be clear from what has just been said, the qualification "thin" as used herein in connection with the membrane layers means that the membrane layers are thin compared with conventional granular filter layers.

In the case of the invention the conventional filter bed of granular materials are obviated and the filter granules are replaced in the device by so-called permeation areas or surfaces which are arranged perpendicularly to the principal flow direction. The principal flow direction may be parallel or antiparallel to gravity. These permeation surfaces are realized by permeable, thin membrane layers which are disposed at small mutual spacings of for example approximately 0.5–10 mm, preferably 1–5 mm. In order to insure depth action of the filter larger circular or disk-shaped holes, so called macroholes of, for example 0.1 to 5 mm are provided in these membrane layers at predetermined spacings; through these holes the major portion of the liquid throughput continues to flow largely unimpeded—even after a long period of filter operation and the turbidity deposit on the membrane layers which results therefrom. The arrangement of the macroholes in the different layers may be statistically irregular, it may however also be carried out more or less systematically and thus be optimally adapted to any given separation problem. The surface proportion of the macroholes in the membrane layers may be up to 20%. In a preferred embodiment of the invention the number and/or size of the macroholes are made to differ in the individual membrane layers in the principal flow direction. The total area of the macroholes, related to the total area of the membrane layers may be unchanged in the individual layers, that is, to a smaller number of larger holes in one layer corresponds a larger number of smaller holes in another layer. Preferably the macroholes are made smaller, continuously or step-wise, in the individual layers in the principal flow direction. However, it is also possible to make the total area of the macroholes in the individual membrane layers of different size, for example to decrease or increase the number and/or size of the holes in the principal flow direction.

As a matter of principle it is also possible to provide within one layer macroholes of different size or form if this should be required for special separation and deposition problems.

It is also possible to make the spacings of the individual membrane layers different from each other in the principal flow direction. More particularly, the spacing may increase or decrease in principal flow direction, either continuously or step-wise.

By combining different mutual spacings of the individual membrane layers and by different or uniform design and arrangement of the macroholes the filter bed may be closely adapted to a special separation problem: Even for a larger number of membrane layers a considerably reduced bed height may be achieved compared with conventional deep bed filters and simultaneously, through the optimal design of the macroholes, the pressure drop across the filter bed may be markedly reduced without a reduction in the separation efficiency. The total height of the membrane stacking package may be several cm up to approximately 1 m. The separation process in such a depth filter is considerably influenced by the structure and the associated permeability of the membrane without the macroholes. In general it is of advantage if the membrane structure is as heterogeneous as possible, for example if fine fibers adhere to the membrane surface. The permeability of the membrane should be as high as possible, as long as the particle retention is consistent with sufficiently good. This may be accomplished particularly by membranes which for example consist of a relatively coarse-meshed fabric, with small microfibers extending from the principal fibers of this fabric, or by membranes which, in a similar manner, are built up of a heterogeneous network. The optimal degree of permeability greatly depends on the characteristics of the turbidities to be separated in any given case so that even in the case of particles with a certain sedimentation or flotation ability very good separation efficiency can be achieved even with non-permeable membrane materials.

As regards the particle separation mechanisms the new type of design of the filter bed has the following advantages:

1. Added to the classic particle separation mechanisms in depth filters of granular materials, is, as a further mechanism in the case of the invention the convective transport due to permeation.
2. Hydrodynamically conditioned retardation of the particle deposition on solid surfaces by liquid films which have to be displaced is greatly reduced.
3. In the case of greatly structured membrane surfaces the microfibers can act for example as additional collectors and hence markedly enhance the separation efficiency.
4. The sedimentation or flotation ability of turbidity particles can be better utilized compared with granular filter layers.
5. By suitable selection and arrangement of the membrane layers the probability of particle adhesion can be substantially increased compared with granular filter layers.
6. Adhesion of the particles is additionally improved by the permeation.

All of these advantages result in a markedly improved particle separation efficiency and a considerably higher deposit capacity of the depth filter, and this leads to a substantially smaller apparatus volume, because of with the extremely small volume taken up by the filter material itself. In addition the invention has the advantage that the membrane layers as to their structure and arrangement can be optimally adapted to a given separation problem. This also makes a targeted control of the pressure drop increasing with increase deposit possible so that for example a reversal to cake filtration can be absolutely avoided.

Filtration velocities up to 50 m/h can be attained. The pressure drop over a membrane layer package varies, depending on the filter design, in the range of 0.01 bar to 0.5 bar whereby the absolute pressure may amount to several bar. By means of the non-problematic adaptability of the membrane surfaces to special filtration requirements it is possible to handle turbidity concentrations of up to approximately 0.5 volume percent in the filter inlet and removal efficiencies of markedly more than 99%. The ultimate specific deposit in a membrane layer package reaches values up to approximately 50% (turbidity volume/apparatus volume). Particles in the size range of approximately 20 nm to 200 μm may be separated whereby the density difference of these particles with respect to the liquid may be as small as desired. The filter operation period between two successive regeneration phases may amount up to several days or several weeks. The filter regeneration requires an expenditure of time from several seconds to approximately one minute and it is therefore considerably shorter than in the case of known depth filters.

BRIEF DESCRIPTION OF THE DRAWINGS

The invention will now be described in greater detail with reference to the drawings:

FIG. 1 is a schematic representation of a section of a filter bed of granular materials and the replacement thereof by permeation layers.

FIG. 2 is a section of a stacking package of membrane layers.

FIG. 3 is a schematic representation of different possible structures of the membrane material.

DETAILED DESCRIPTION OF THE PREFERRED EMBODIMENTS

Figure 4:
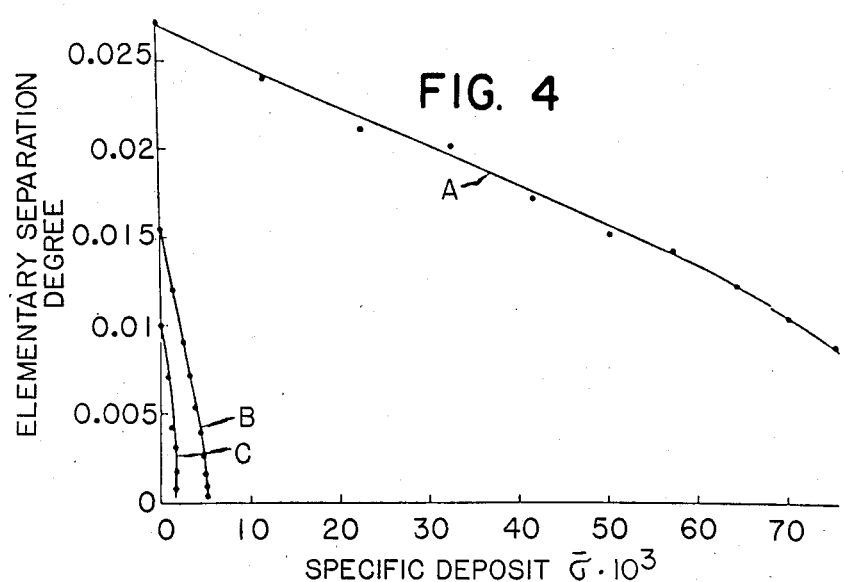
FIG. 4 is a graphic representation of the dependence of the elementary separation degree on the volume-specific deposit for different depth filters.

FIG. 1 schematically shows the structure of the bed of a depth filter with the filter grains 1. In the embodiment according to the invention these are replaced by permeation surfaces 2 merely indicated in FIG. 1. The principal flow direction through the filter in both cases is marked by the arrows.

FIG. 2 schematically shows the arrangement of the permeation surfaces 2 extending cross-wise of the principal flow direction marked with arrows, in a depth filter and a section of the stacking package of membrane layers 3. The membrane layers exhibit the macroholes 4 in mutually staggered positions.

FIG. 3 in its left part shows a possible structure of the membrane material of the permeation surfaces or membrane layers with the main fibers 5 of a filter fabric and adhering microfibers 6. In the right-hand part there is illustrated a heterogeneous network of main fibers 5 and of adhering microfibers 6 as it may be obtained in fleece production.

FIG. 4 shows experimental results of the change of the filtration efficiency. There is plotted the mean elementary separation degree against the volume-specific filter deposit for a membrane filter (A) according to the invention, filter coke ($d_k = 1.5 - 2.0$ mm) (B) and quartz gravel ($d_k = 1.5 - 2.0$ mm) (C), obtained for quartz particles of 3 μm diameter which are dispersed in tap water, the total quartz particle concentration in the filter inlet being 100 mg/l sikron H 200.

Figure 5:
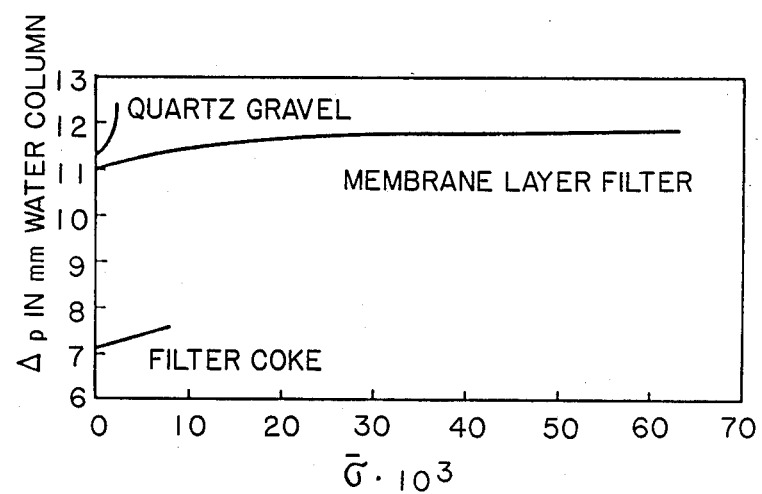
FIG. 5 shows the pressure drop of depth filters as a function of the specific deposit for different filter materials.

The specific filter deposit is the volume of the particles deposited in the filter, related to the entire filter-bed-volume. The individual curves describe the performance of depth filters of granular materials of different kinds (quartz gravel C, filter coke B) as well as a membrane layer filter A, built at laboratory scale, according to the invention, whereby the total filter height (bed height of the filter granules or the stack height of the membrane layers) in all cases was 6 cm and the filtration velocities (empty-tube velocity) also in all cases was kept constant at 10 m/h. The diameter of the granular materials was in the range of 1.5 to 2 mm. In order to make a comparison between the various conditions possible, the spacing between membrane layers was adjusted to 2 mm. As membrane material a micro-filter fabric or synthetic fibers with a fiber diameter of approximately 40 μm was used. The advantages of the membrane layer filter which result under the chosen conditions, particularly at higher filter deposits, are clearly recognizable. Likewise evident is the substantially higher ultimate deposit of the membrane layer filter compared with the dimensionally comparable granular filters. The increase in pressure drop of the membrane filter according to the invention as determined for these filters, compared with granular beds is illustrated in FIG. 5. In spite of considerable higher filter loading this increase lies between that of the quartz gravel and that of the filter coke bed. This shows that the invention affords advantages for the filtration with respect to energy consumption.

If under such conditions one would dimension a depth filter which is loaded with a particle input concentration of 10 g/m³ and which is to attain a filter operation period of 48 h, then for a continuously required cleaning efficiency of at least 99% of the turbidity amount in the raw water, a quartz filter of 2.5 m height or a filter-coke filter of 1.2 m height would be required. With the membrane layer filter according to the invention which in the investigation results shown in FIGS. 4 and 5 had not yet been optimally adapted to the problem at hand, a total filter height of only 0.18 m would be required. This example also shows that the layer spacings as well as the number of the layers may still be chosen somewhat higher, and this still leads to a considerable saving in filter volume compared with a filter bed of granular material.

Figure 6:
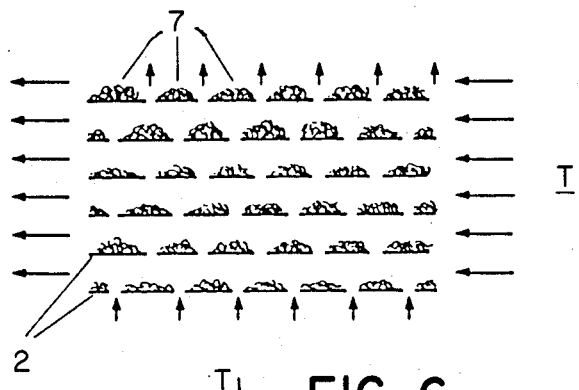
FIG. 6 schematically shows the regeneration or the flushing of the filter bed according to the invention.

In FIG. 6 the process of the filter regeneration is illustrated. After loading 7 of the permeation surfaces 2 of the individual membrane layers, the regeneration is effected by means of a short-time cross-wise flushing I, parallel to the membrane layers. A suitable upward (II) or downward current is superimposed. Depending on the treatment problems at hand the employment of an ultrasonic blast may also be useful in the flushing of the filter.

The process and device of the invention which were experimentally checked under different conditions, can also be easily realized at a large scale by a more modular design. The membrane layers are installed as packages in suitably dimensioned filter columns or in existing depth filters. In the case of large-area membrane layers it may be necessary to insure the horizontal attitude of the membrane layers by the installation of suitable support elements between the individual layers. As a matter of principle however it is also possible to provide the membrane filter surfaces in suitable frames which then are combined, side by side, to form larger filter surfaces in order to avoid the sagging of the membrane filter layers. The filter surfaces in a membrane stacking package may amount to several hundred square meters.

The practical advantages of the invention on the one hand are to be seen in that the filter can be used at high economy even for higher turbidity loads, for example in the flocculation—or flock—filtration whereby the volume of the installation or the apparatus is substantially reduced as compared with a conventional depth filter of granular materials. On the other hand, a membrane layer filter can also be advantageously employed as a preliminary stage for an extrafine filtration (for example slow-sand or silt filtration as well as ultra or hyper filtration), which, in the case of the latter, leads to improved performance in operation. The device according to the invention, and the process, offer ideal conditions for filter conditioning, as for example in the case of an activated carbon powder or kieselguhr embedment. In addition, a membrane layer filter may be so designed that in the case of special solid/liquid separation problems, also a classification or sorting of the removed turbidity may be achieved by the separation process. This occurs particularly if the spacing and the size of the macroholes as well as the structure of the membranes are made different in the individual membrane layers.

List of References

1 Filter granules
2 Permeation surfaces
3 Membrane layers
4 Macroholes
5 Main fibers
6 Microfibers
7 Deposits on the membrane layers
  I Current direction of the cross-wise flushing
  II Possible flow direction for the superimposed upward flow

I claim:

1. Device for separating turbidities from liquids, wherein the filter device comprises a plurality of mutually spaced, thin permeable membrane layers extending cross-wise of the principal flow direction, and wherein the individual membrane layers contain microholes and also contain macroholes, said macroholes being of a size such that the major portion of the liquid throughput passing through the filter device, flows through the macroholes, the macroholes in adjacent membrane layers being provided at mutually displaced locations and the spacing between adjacent membrane layers being such as to permit the cross-wise flow from the macroholes in a predetermined layer to the macroholes at the displaced locations in the next adjacent layer, the flow through the macroholes resulting in a reduction in the pressure drop through the filter device.

2. Device as claimed in claim 1, wherein the macroholes are distributed in a statistically irregular fashion.

3. Device as claimed in claim 1 or 2, wherein the mutual spacings of the individual membrane layers are made different from each other in the principal flow direction.

4. Device as claimed in claim 1 or 2, wherein the number and/or size of the macroholes in the individual membrane layers are made different in the principal flow direction.

5. Device as claimed in claim 1 or 2, wherein the surfaces of the individual membrane layers are structured.

6. Device as claimed in claim 1 or 2, wherein the filter device has liquid connections for the production of a cross-wise flow parallel to the individual membrane filter layers and perpendicular to the principal flow direction.

7. Process for separating turbidities from liquids which uses permeation layers, said process comprising
  providing a filter device including a plurality of spaced serially arranged permeable membrane layers with macroholes, and
  carrying out the filter regeneration by short time cross-wise flushing of the filter device with a superimposed upward or downward flow through the filter device.

8. Process as claimed in claim 7, wherein the liquid in the filter device in the flushing phase is additionally exposed to an ultra sound blast.

9. Device as claimed in claim 1, wherein the macroholes are arranged in a regular pattern, the centers, projected in principal flow direction, of the macroholes being spaced from each other as far as possible for any two mutually superposed membrane layers.

* * * * *